US008929882B2

(12) United States Patent
Srinivasan et al.

(10) Patent No.: US 8,929,882 B2
(45) Date of Patent: Jan. 6, 2015

(54) MEASUREMENT OF CELLS ARRANGED IN GROUPS OF DIFFERENT PRIORITIES

(75) Inventors: Shivratna Giri Srinivasan, San Diego, CA (US); Supratik Bhattacharjee, San Diego, CA (US); Brian Clarke Banister, San Diego, CA (US); Udayan Murli Bhawnani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 13/442,629

(22) Filed: Apr. 9, 2012

(65) Prior Publication Data

US 2013/0267221 A1 Oct. 10, 2013

(51) Int. Cl.
*H04W 4/00* (2009.01)
(52) U.S. Cl.
USPC ....................................................... 455/422.1
(58) Field of Classification Search
USPC .............. 455/525, 456.1, 436, 458, 434, 449, 455/63.1, 423, 453, 452.2, 432.1, 450, 561, 455/447, 67.11, 437; 370/395.1, 329, 241, 370/208, 348
See application file for complete search history.

(56) References Cited

U.S. PATENT DOCUMENTS

| 8,385,927 | B2* | 2/2013 | Pfeiffer | 455/449 |
| 2009/0047958 | A1 | 2/2009 | Rimhagen et al. | |
| 2010/0003986 | A1 | 1/2010 | Chen | |
| 2012/0046066 | A1* | 2/2012 | Tamura et al. | 455/525 |
| 2012/0252452 | A1* | 10/2012 | Martin et al. | 455/436 |
| 2012/0252455 | A1* | 10/2012 | Martin et al. | 455/436 |
| 2012/0264449 | A1* | 10/2012 | Kazmi et al. | 455/456.1 |
| 2012/0281544 | A1* | 11/2012 | Anepu et al. | 370/241 |

FOREIGN PATENT DOCUMENTS

EP 2360965 A1 8/2011

OTHER PUBLICATIONS

International Search Report and Written Opinion—PCT/US2013/034776—ISA/EPO—Jul. 9, 2013.

* cited by examiner

*Primary Examiner* — Kiet Doan
(74) *Attorney, Agent, or Firm* — Austin Rapp & Hardman

(57) ABSTRACT

Techniques for making measurements of cells in a wireless network are disclosed. In an aspect, cells to be measured are arranged into groups with different priorities. Groups with higher priority include stronger cells, which are measured more frequently and/or with more filtering to improve measurement accuracy. In one design, a user entity determines a plurality of groups of cells to make measurements. Each group includes at least one cell, and the plurality of groups have different priorities. The user entity determines a measurement interval for each of the plurality of groups of cells, with higher priority groups having shorter measurement intervals. The user entity schedules each cell in each group for measurement at least once (e.g., once) within the measurement interval for that group. The user entity makes measurements for the plurality of groups of cells based on the measurement interval for each group.

33 Claims, 12 Drawing Sheets

MEASUREMENT OF CELLS ARRANGED IN GROUPS OF DIFFERENT PRIORITIES

BACKGROUND

I. Field

The present disclosure relates generally to communication, and more specifically to techniques for making measurements of cells in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of user entities. A cell can refer to a base station or the coverage area of the base station, depending on the context in which the term is used. A user entity may communicate with a serving cell and may be within or near the coverage of neighbor cells. The user entity may periodically make measurements of the serving cell and the neighbor cells in order to determine whether there is any cell better than the serving cell. This may be the case, for example, if the user entity is mobile and moves about the wireless network. If a better cell is found, as indicated by the measurement results, then the user entity may be handed over from the current serving cell to the better cell, which would then become the new serving cell.

Cell measurement is important to ensure good performance for the user entity and the wireless network. However, cell measurement consumes valuable resources (e.g., processing resources and battery power) at the user entity. There is therefore a need in the art for techniques to make measurements of cells in an efficient manner.

SUMMARY

Techniques for efficiently making measurements of cells in a wireless network are disclosed herein. In an aspect, a plurality of cells to be measured may be arranged into groups with different priorities. The group with the highest priority may include stronger cells, which may be measured more frequently and/or with more filtering to obtain more accurate measurement results. Groups with progressively lower priorities may include progressively weaker cells, which may be measured less frequently and/or with less filtering to reduce measurement overhead.

In one design, a user entity may determine a plurality of groups of cells to make measurements. Each group may include at least one cell, and the plurality of groups may have different priorities. The user entity may determine a measurement interval for each of the plurality of groups, with higher priority groups having shorter measurement intervals. The user entity may schedule each cell in each group for measurement at least once (e.g., just once) within the measurement interval for that group. The user entity may make measurements for the plurality of groups of cells based on the measurement interval for each group.

The user entity may determine the number of groups of cells, or the number of cells in each group, or the measurement interval for each group, and/or some other parameter based on one or more inputs such as the total number of cells to measure, the available measurement time, the measurement duration for each cell, etc. In one design, the plurality of groups may have different measurement intervals. In one design, the measurement interval for each group may be configurable and may be selected from a plurality of possible measurement intervals for that group.

In one design, the user entity may maintain a plurality of sets of cells. Each set may include at least one cell and may be associated with conditions for cells entering and leaving the set. In one design, the user entity may determine the plurality of groups of cells based on the plurality of sets of cells. In one design, each group of cells may correspond to one set of cells. In another design, each group of cells may include all or part of one or more sets of cells. In yet another design, the user entity may determine the plurality of groups of cells by prioritizing a plurality of cells to measure, without maintaining the plurality of sets of cells. The user entity may also determine the plurality of groups of cells in other manners.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
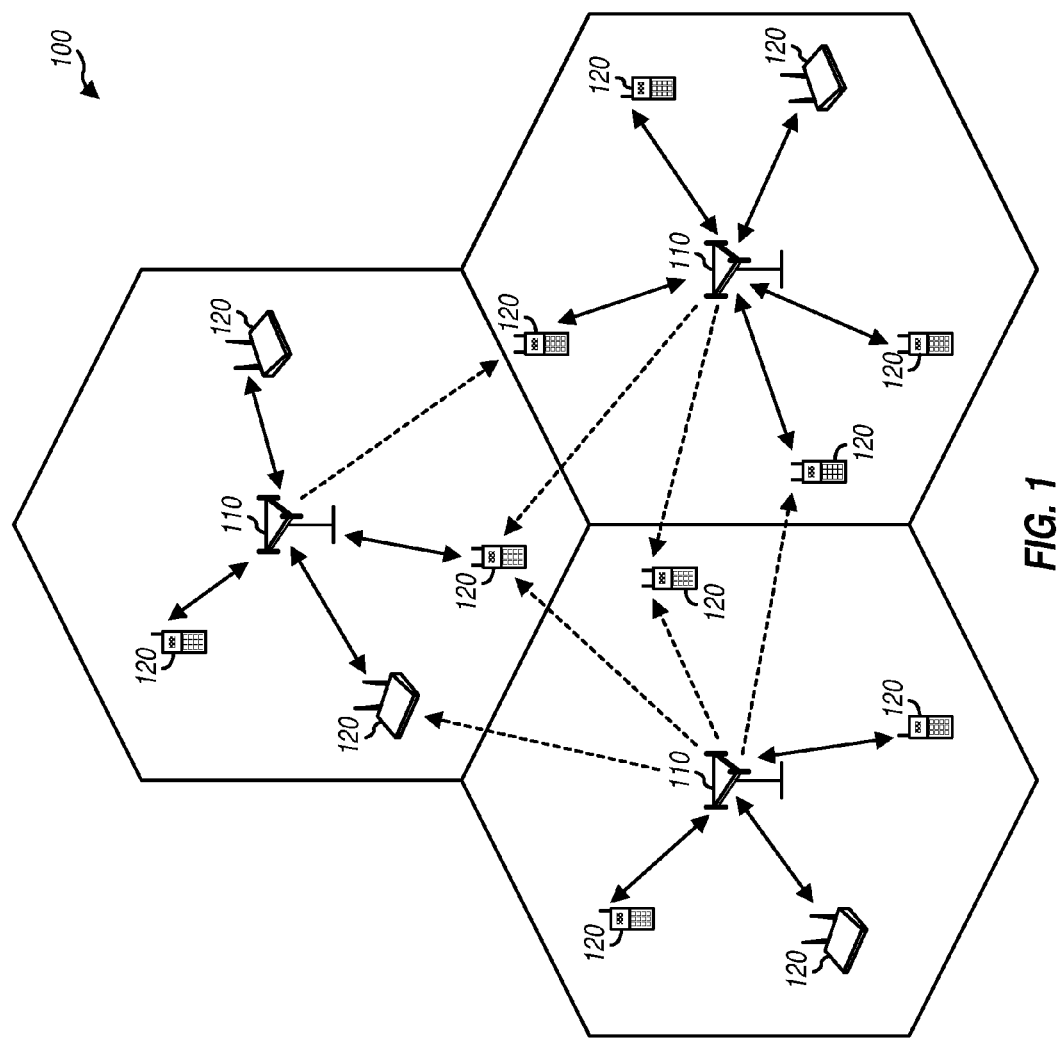
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with user equipments (UEs) and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In 3GPP, the term "sector" or "cell-sector" can refer to a coverage area of a base station and/or a base station subsystem serving this coverage area. For clarity, 3GPP concept of "cell" is used in the description below.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a smartphone, a tablet, a handheld device, a laptop computer, a cordless phone, a wireless local loop (WLL) station, a netbook, a smartbook, etc. A UE may communicate with a cell via the downlink and uplink. The downlink (or forward link) refers to the communication link from the cell to the UE, and the uplink (or reverse link) refers to the communication link from the UE to the cell. In FIG. 1, a solid line with arrows on both ends indicates active communication between a UE and a cell. A dashed line with an arrow at one end indicates reception of downlink signals (e.g., synchronization signals and/or reference signals) by a UE from a cell.

Wireless network 100 may include many cells. A UE may be within the coverage of a number of cells at any given moment. One of the cells may be selected to serve the UE and may be referred to as a serving cell.

The UE may be required to periodically measure and report the top N neighbor cells that have been identified by the UE, where N may be equal to 6, 8, or some other value. In a dynamically changing environment (e.g., due to mobility of the UE), new cells may rise and existing cells may fade away in a dynamic manner. Consequently, the UE may need to measure many more than N cells in order to ensure that the UE can report the top N cells. If a cell was not measured by the UE due to the cell being undetected or too weak some time back, then the cell may not be detected in time when it has grown in strength and should be part of the top N cells. Measuring a large number of cells to ensure up to date measurement results for the top N cells may require much processing and battery resources at the UE, which may be unavailable in some UE implementations.

In an aspect, a plurality of cells to be measured may be arranged into multiple sets with different priorities. In one design, the cells may be arranged based on their received signal strength and/or other criteria. The set with the highest priority may include the strongest cells, which may be measured more frequently and/or with more filtering to obtain more accurate measurement results. Sets with progressively lower priority may include progressively weaker cells, which may be measured less frequently and/or with less filtering to reduce processing and battery resources.

The set-based cell measurement scheme may provide certain advantages. First, the scheme may allow for measurement of a relatively large number of cells, possibly without appreciably increasing processing requirements. Second, the scheme may provide an opportunity for a weak cell in a lower priority set to transition to a higher priority set and hence get measured more often and more accurately. Third, the scheme may improve cell detection and provide better handover decisions. If the number of cells that can be measured is much larger than the number of cells to be reported, then a false alarm probability of neighbor cell detection may be increased (i.e., the false alarm requirement can be relaxed). This may result in higher probability of detecting weaker cells, albeit at the expense of more spurious cells being included in one or more sets and scheduled for measurement. Hence, the ability to measure more cells may be exploited to improve cell detection and cell measurement, which may lead to better handoff decisions. The scheme may also provide other advantages. The scheme may provide a framework to dynamically track significantly more than N cells in a mobile environment at any given time without appreciably increasing the processing requirements at a UE.

In general, any number of sets of cells may be defined. For clarity, much of the description below is for a specific design in which four sets of cells are defined and are listed in Table 1.

TABLE 1

| Sets of Cells | | Description |
| --- | --- | --- |
| ASET | Active Set | Include the current serving cell for a UE. |
| VASET | Virtual Active Set | Include strongest neighbor cells for the UE. |
| CSET | Candidate Set | Include cells that have been measured but not strong enough to be included in the VASET. |
| DSET | Detected Set | Include cells that have been detected but not yet measured. |

In general, the cells may be arranged into sets based on various criteria. In one design, the cells may be arranged based on received signal strength, which may be given by reference signal received power (RSRP) in LTE. In another design, the cells may be arranged based on received signal quality, which may be given by reference signal received quality (RSRQ) in LTE. The cells may also be arranged into sets based on other criteria.

Figure 2:
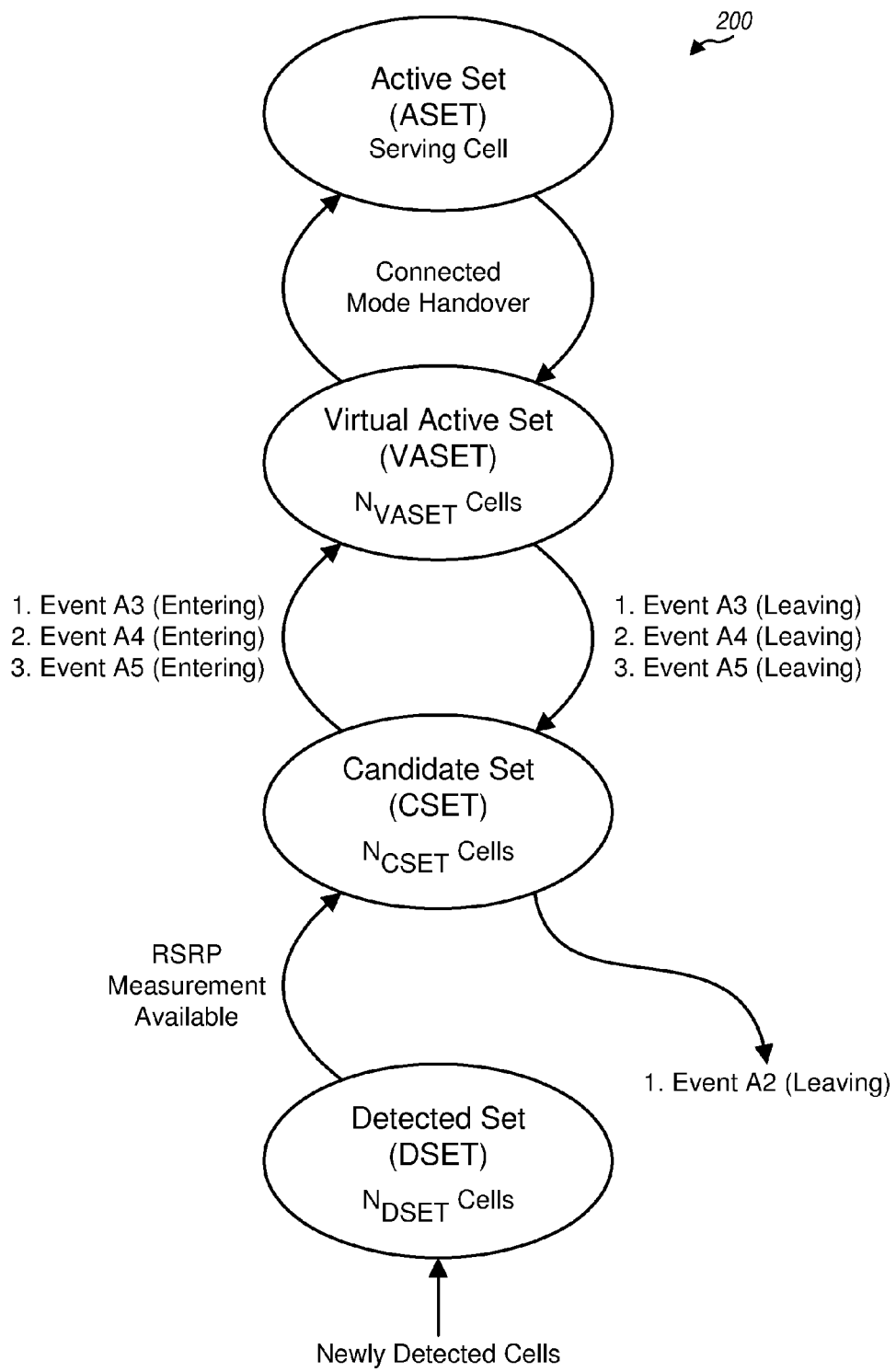
FIG. 2 shows a state diagram for four sets of cells maintained by a UE.

FIG. 2 shows a design of a state diagram 200 for the four sets of cells in Table 1 for a UE. In one design, the ASET may include only the serving cell for the UE, and the number of cells in the ASET may be given as $N_{ASET}=1$. The serving cell may be continually measured as part of channel estimation to demodulate a downlink signal from the serving cell.

The VASET may include cells with sufficiently strong RSRP, which may be quantified based on certain event thresholds as described below. The cells in the VASET may be prime candidates for a handover of the UE and hence may be measured more frequently and/or over a longer duration. In one design, the VASET may include a variable number of cells, which may be denoted as $N_{VASET}$.

The CSET may include cells that have been measured but are not strong enough to be included in the VASET. The cells in the CSET have not triggered an event for handover. In one design, the CSET may include a variable number of cells, which may be denoted as $N_{CSET}$.

The DSET may include cells that have been detected by the UE but not yet measured for RSRP. Newly detected cells may be placed in the DSET and may be subsequently scheduled for measurement. In one design, the DSET may include a variable number of cells, which may be denoted as $N_{DSET}$.

In general, each set may include any number of cells and may include a fixed or a variable number of cells. In one design that is described above, the VASET, CSET and DSET may each include a variable number of cells. In one design, sets with progressively higher priority may include progressively fewer cells (or have progressively smaller cardinality), which may be expressed as:

$$N_{ASET} \leq N_{VASET} \leq N_{CSET} \leq N_{DSET} \qquad \text{Eq (1)}$$

The design in equation (1) may allow more cells to be measured with a given amount of processing resources. In one design, the total number of cells in all sets may be limited to $N_{MAX}$, as follows:

$$N_{ASET} + N_{VASET} + N_{CSET} + N_{DSET} \leq N_{MAX} \qquad \text{Eq (2)}$$

where $N_{MAX}$ may be equal to 10, 15, 20, or some other value. The design in equation (2) may place an upper bound on the amount of processing resources needed for cell measurement.

In general, each set may include cells that may be selected based on any criteria. In one design, cells may be selected for each set based on received signal strength or RSRP. In one design, moving from the highest to lowest priority sets, the size of the sets generally increases and the RSRP of the cells in the sets generally decreases.

FIG. 2 also shows exemplary transitions between the four sets of cells, in accordance with one design. The UE may perform handover from the current serving cell in the ASET to a new serving cell in the VASET if certain conditions/criteria are satisfied. The current serving cell may then transition from the ASET to the VASET, and the new serving cell may transition from the VASET to the ASET.

Newly detected cells may be placed in the DSET. Cells in the DSET may transition to the CSET if RSRP is measured for these cells. Cells in the CSET may transition to the VASET if certain "entering" conditions are satisfied, as described below. Cells in the VASET may transition back to the CSET if certain "leaving" conditions are satisfied, as also described below. Cells in the CSET and/or the DSET may be removed if certain "leaving" conditions are satisfied.

The conditions for transitioning between different sets of cells may be referred to as transition conditions. The transition conditions may be defined in various manners. In one design, the transition conditions may be defined based on one or more of the following events:

Event A1: serving cell becomes better than a threshold.
Event A2: serving cell becomes worse than a threshold.
Event A3: neighbor cell becomes better than serving cell by an offset.
Event A4: neighbor cell becomes better than a threshold.
Event A5: serving cell becomes worse than a first threshold and neighbor cell becomes better than a second threshold.

Other events may also be defined and used for transitioning between sets of cells. Each event may be associated with an entering condition and a leaving condition. In one design, the entering conditions for events A1 through A5 may be defined based on entering criteria for events A1 through A5, which may be defined as follows:

A1-1: this entering criterion for event A1 occurs if the RSRP of the serving cell is above a RSRP level of $Thresh_{A1} + Hys_{A1}$, where $Thresh_{A1}$ is a threshold and $Hys_{A1}$ is a hysteresis for event A1.

A2-1: this entering criterion for event A2 occurs if the RSRP of the serving cell is below a RSRP level of $Thresh_{A2} + Hys_{A2}$, where $Thresh_{A2}$ is a threshold and $Hys_{A2}$ is a hysteresis for event A2.

A3-1: this entering criterion for event A3 occurs if the RSRP of a neighbor cell is above a RSRP level of $Ms + Hys_{A3} + Os_{A3}$, where Ms is the RSRP of the serving cell, $Hys_{A3}$ is a hysteresis for event A3, and $OS_{A3}$ is an offset for event A3.

A4-1: this entering criterion for event A4 occurs if the RSRP of a neighbor cell is above a RSRP level of $Thresh_{A4} + Hys_{A4} - Os_{A4}$, where $Thresh_{A4}$ is a threshold, $Hys_A4$ is a hysteresis, and $OS_A4$ is an offset for event A4.

A5-1: this entering criterion for event A5 occurs if the RSRP of the serving cell is below a first RSRP level of $Thresh_{A5} - Hys_{A5}$ and the RSRP of a neighbor cell is above a second RSRP level of $Thresh_{A52} + Hys_{A5} - Os_{A5}$, where $Thresh_{A51}$ is a threshold, $Hys_{A5}$ is a hysteresis, and $OS_{A5}$ is an offset for event A5.

The entering criteria for events A1, A2, A4, and A5 are based on absolute RSRP levels, which are determined based on thresholds. The entering criterion for event A3 is based on a relative RSRP level, which is determined based on the RSRP of the serving cell. The RSRP levels, thresholds, and offsets may be given in units of decibel (dB). The entering criteria may also be defined in other manners.

In one design, an entering condition may be defined by the occurrence of an entering criterion for a particular event (e.g., event A3, A4 or A5) for a particular time period, which may be referred to as a time-to-trigger (TTT). In the design shown in FIG. 2, a cell may be moved from the CSET to the VASET if an entering condition for event A3, A4 or A5 is satisfied for the cell.

Figure 3A:
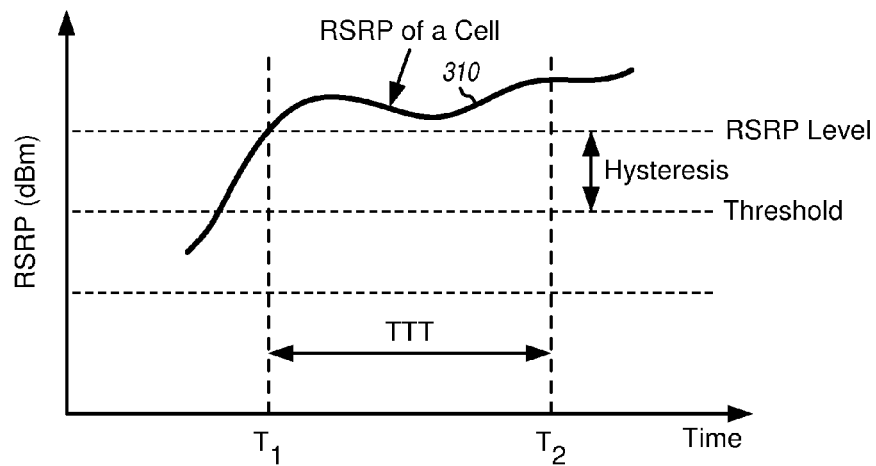
FIG. 3A shows an exemplary plot of an entering condition.

FIG. 3A shows an exemplary plot of an entering condition. The RSRP of a cell under evaluation is shown by a plot 310. An entering criterion occurs at time $T_1$ when the RSRP of the cell exceeds a RSRP level equal to a threshold plus a hysteresis. For example, the RSRP level may be equal to $Ms + Hys_{A3} + Os_{A3}$ for event A3. The entering condition may be satisfied at time $T_2$ when the RSRP of the cell remains above the RSRP level for a time period of TTT. The cell may be moved from the CSET to the VASET at time $T_2$.

In one design, the leaving conditions for events A1 through A5 may be defined based on leaving criteria for events A1 through A5, which may be defined as follows:

A1-2: this leaving criterion for event A1 occurs if the RSRP of the serving cell is below a RSRP level of $Thresh_{A1} - Hys_{A1}$.

A2-2: this leaving criterion for event A2 occurs if the RSRP of the serving cell is above a RSRP level of $Thresh_{A2} + Hys_{A2}$.

A3-2: this leaving criterion for event A3 occurs if the RSRP of a neighbor cell is below a RSRP level of $Ms - Hys_{A3} + Os_{A3}$.

A4-2: this leaving criterion for event A4 occurs if the RSRP of a neighbor cell is below a RSRP level of $Thresh_{A4} - Hys_{A4} - Os_{A4}$.

A5-2: this leaving criterion for event A5 occurs if the RSRP of the serving cell is above a first RSRP level of $Thresh_{A51} + Hys_{A5}$ and the RSRP of a neighbor cell is below a second RSRP level of $Thresh_{A52} - Hys_{A5} - Os_{A5}$.

The leaving criteria may also be defined in other manners. In one design, a leaving condition may be defined by the occurrence of a leaving criterion for a particular event (e.g., event A3, A4 or A5) for the TTT time period. In the design shown in FIG. 2, a cell may be moved from the VASET to the CSET if a leaving condition for event A3, A4 or A5 is satisfied for the cell.

Figure 3B:
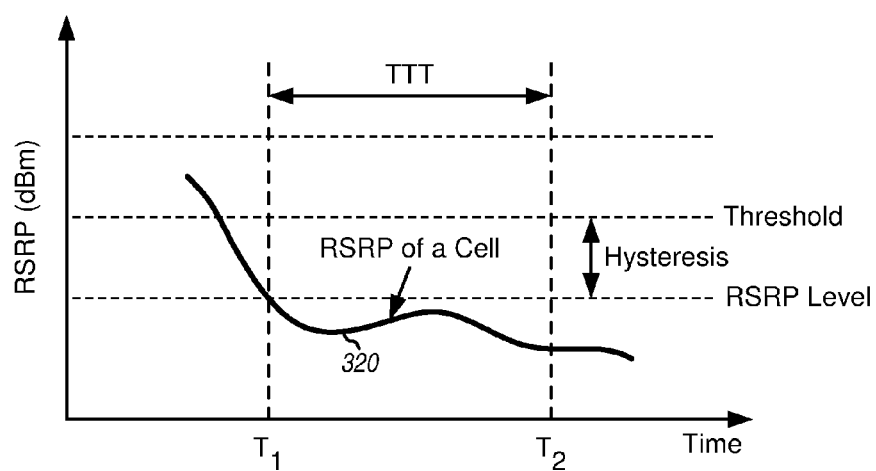
FIG. 3B shows an exemplary plot of a leaving condition.

FIG. 3B shows an exemplary plot of a leaving condition. The RSRP of a cell under evaluation is shown by a plot 320. A leaving criterion occurs at time $T_1$ when the RSRP of the cell drops below a RSRP level equal to a threshold minus a hysteresis. For example, the RSRP level may be equal to $Ms-Hys_{A3}+Os_{A3}$ for event A3. The leaving condition may be satisfied at time $T_2$ when the RSRP of the cell remains below the RSRP level for a time period of TTT. The cell may be moved from the VASET to the CSET at time $T_2$.

In general, the RSRP levels for the entering and leaving criteria may be defined such that good performance can be obtained. In one design, the RSRP levels for entering criteria and the RSRP levels for leaving criteria may be defined with hysteresis, as described above. Hysteresis may reduce the likelihood of a cell being continually move between different sets due to fluctuations in the measured RSRP for the cell.

Figure 4:
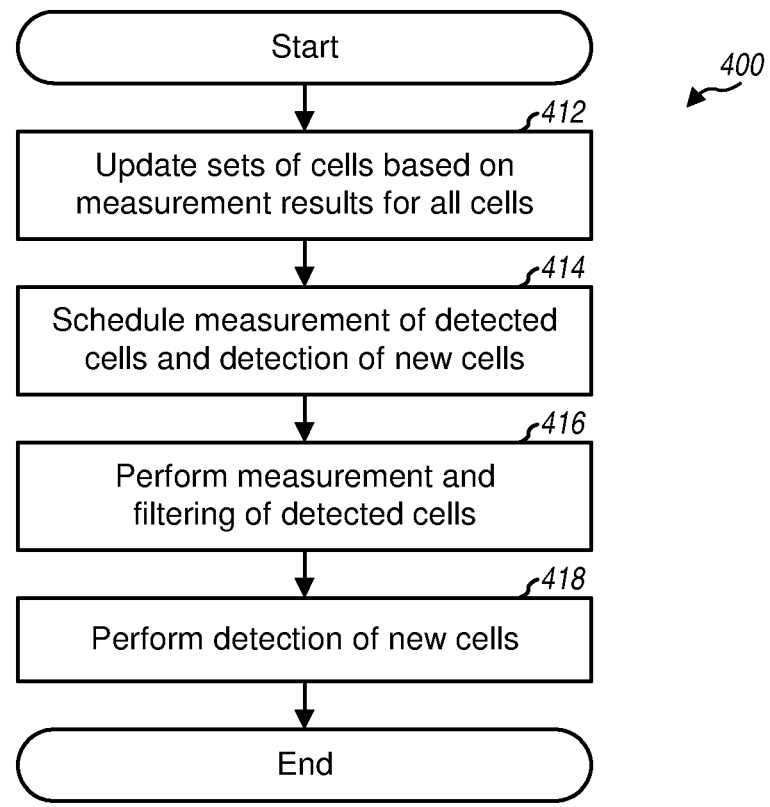
FIG. 4 shows a process for making cell measurement.

FIG. 4 shows a design of a process 400 for making cell measurement. Process 400 may be performed by a UE (as described below) or by some other entity. Process 400 may be performed in each update period of $T_{UPDATE}$, which may be a fixed or configurable period. For example, $T_{UPDATE}$ may be equal to 20, 40, 80, or 160 milliseconds (ms) or some other duration.

In each update period, the UE may update the sets of cells based on the latest measurement results for all cells (block 412). The UE may evaluate one set of cells at a time based on the entering and/or leaving conditions applicable for that set. For each cell in a given set, criteria for the cell leaving the set may be evaluated based on the latest measurement result for the cell, e.g., as described above. Depending on which criterion is satisfied, the cell may remain in the set, or move up to a higher priority set, or move down to a lower priority set, or fall out of the measurement process (e.g., in case of a cell in the CSET in FIG. 2).

The UE may schedule measurement for all cells based on various factors such as the size of each set of cells, the amount of time available for measurement, the presence of absence of gaps, the amount of processing resources at the UE, etc. (block 414). A gap is a period in which measurement of cells is not permitted. The UE may allocate a certain amount of measurement time to each cell or each set of cells based on all pertinent factors. The UE may also schedule detection/search of new cells (also block 414). The output of block 414 may include (i) a measurement schedule for measuring previously identified cells and (ii) a detection schedule for detecting new cells.

The UE may perform measurement and filtering for all sets of cells based on the measurement schedule (block 416). The UE may obtain a RSRP value for each cell at each measurement time and may filter this RSRP value with prior RSRP values to obtain a filtered RSRP value for the cell. The measurement and/or filtering may be performed in different manners for different sets of cells, as described below.

The UE may also perform detection of new cells based on the detection schedule (block 418). The UE may detect for primary synchronization signals (PSS) and secondary synchronization signals (SSS) transmitted periodically by cells and may obtain a cell identity (ID) for each detected cell based on the PSS and SSS received from that cell. The UE may also measure the received signal strength of each detected cell based on the PSS and/or SSS. The UE may rank the detected cells from strongest to weakest and may add an appropriate number of newly detected cells to the DSET, e.g., by accounting for the overall total number of cells as shown in equation (2). In one design, if the number of detected cells ($N_{DET}$) is such that equation (2) is satisfied, then all detected cells may be placed in the DSET. However, if equation (2) is not satisfied, then one or more detected cells may be placed in the DSET such that equation (2) is satisfied. For example, if there is no space to add even one newly detected cell (e.g., if the total number of cells in all sets except for the DSET is equal to $N_{MAX}$), then $N_{ADD}$ strongest detected cells may be added to the DSET, and $N_{ADD}$ weakest cells in the CSET may be removed, where $N_{ADD}$ may be equal to 1, 2, or some other value.

The UE may perform detection for new cells in each detection period of $T_{DETECT}$, which may be a fixed or configurable period. For example, $T_{DETECT}$ may be equal to 20, 40, 80, 160, or 320 ms or some other duration. If the update period is multiple times the detection period, or $T_{UPDATE}=K \times T_{DETECT}$, then the UE may perform K searches in an update period and may combine the results from the K searches in an appropriate manner to detect for new cells. Conversely, if the detection period is multiple times the update period, or $T_{DETECT}=K \times T_{UPDATE}$, then the UE may perform a search once in every K update periods.

In one design, the UE may adaptively schedule measurement of cells in each scheduling period. The scheduling for each scheduling period may provide one or more of the following:

A list of cells to measure in the scheduling period,
Measurement interval—interval between measurements of a cell,
Measurement duration—duration of measurement for a cell, and
Filtering period—indicates amount of filtering for a cell.
The scheduling may also provide other parameters to use for cell measurement.

In one design, different sets of cells may be associated with different sets of parameter values for measurement. Progressively higher priority sets may be associated with progressively more frequent measurement and/or progressively more filtering. The cells in each set may be scheduled for measurement based on the set of parameter values applicable for that set. If each set can include a variable number of cells, then a variable amount of processing resources may be used to measure a variable number of cells in each set.

In another design, cells to be measured may be arranged into multiple tiers. A tier may also be referred to as a group, etc. Each tier may include cells in one or more sets, and the cells in each tier may be measured based on a set of parameter values for that tier. Different sets of parameter values may be used for different tiers. The use of tiers may enable better utilization of a fixed amount of processing resources for measuring a variable number of cells in each set.

Figure 5:
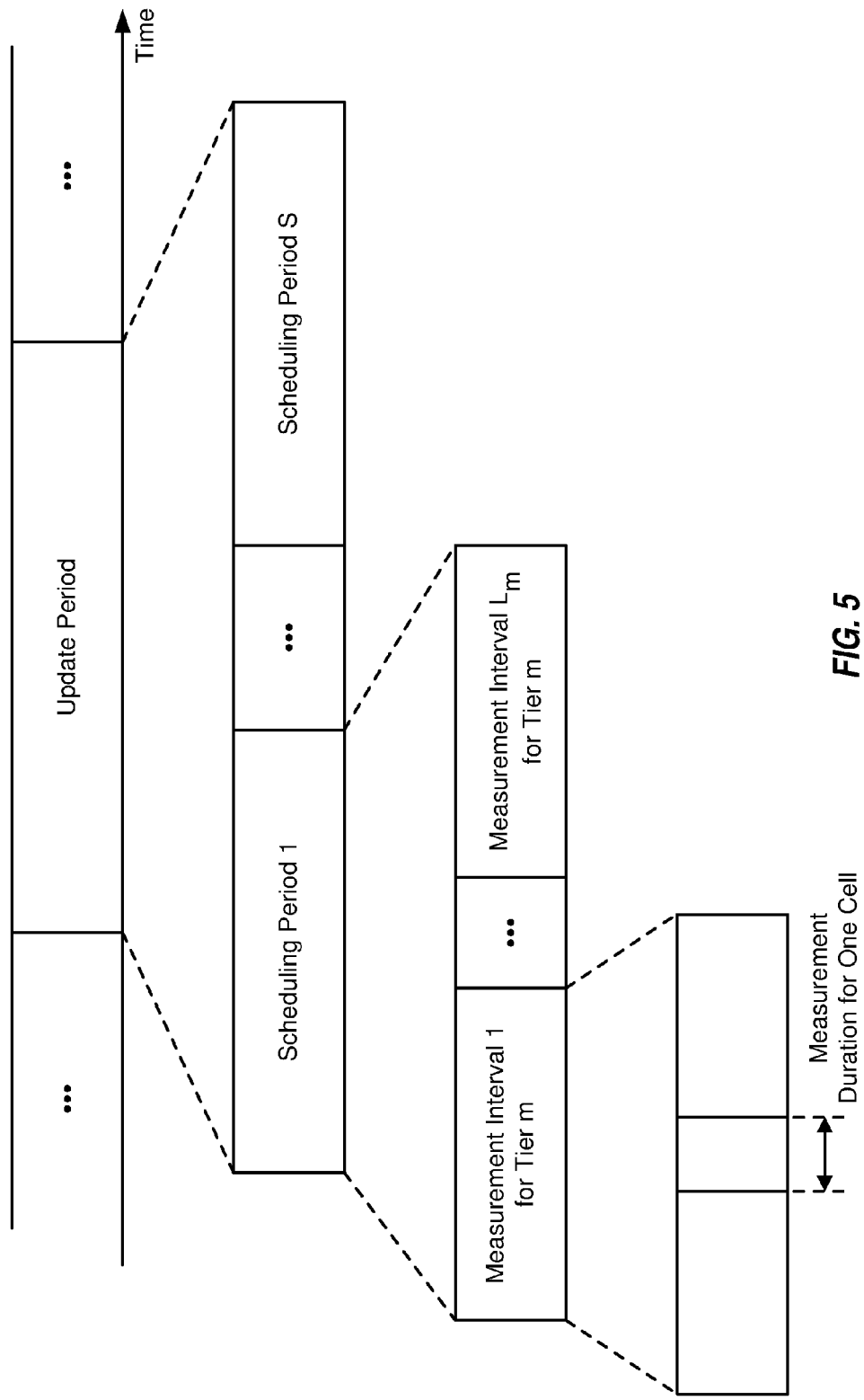
FIG. 5 shows a timing diagram for making cell measurement.

FIG. 5 shows a design of a timing diagram for making cell measurement. The timeline for cell measurement may be partitioned into update periods, with each update period covering a particular duration (e.g., 80, 160, or 320 ms). A list of cells to measure may be fixed for the duration of an update period and may be updated at the end of the update period. For example, tiers of cells may be defined at the start of each update period, and sets of cells may be updated at the end of each update period.

The update period may include S scheduling periods, where S may be one or greater. The list of cells may be scheduled for measurement in each scheduling period. The measurement parameters may change from scheduling period to scheduling period, e.g., depending on whether a gap is present in a scheduling period.

Each scheduling period may include $L_m$ measurement intervals for tier m, where $L_m$ may be one or greater and may be different for different tiers. Different tiers may be associated with different measurement intervals, as described below. All cells in each tier may be measured within the measurement interval for that tier. Each cell may be measured within one measurement duration, which may be 1 ms or some other duration.

In general, cell measurement scheduling may allocate a suitable measurement interval to higher priority cells (e.g., cells in the VASET or tier 1) while ensuring that lower priority cells (e.g., cells in the CSET or tier 2) are allocated a certain minimum measurement interval. As an example, if the measurement duration is 1 ms, then the measurement interval for the higher priority cells may be 5 ms, and the minimum measurement interval may be 10 ms. Reasonable measurement accuracy may be achieved if cells are filtered in each update period and lower priority cells can tolerate a lower measurement accuracy until they qualify to be part of a higher priority set.

In one design, a cell measurement scheduling algorithm may receive various inputs, which may include one or more of the following:
A list of cells to measure, sorted in terms of RSRP,
Total number of cells ($N_{CELL}$) to measure in each scheduling period,
Available measurement time ($T_{AVAIL}$) in each scheduling period, and
Measurement interval for each tier.
The scheduling algorithm may determine the number of tiers and the number of cells in each tier based on the inputs.

Figure 6:
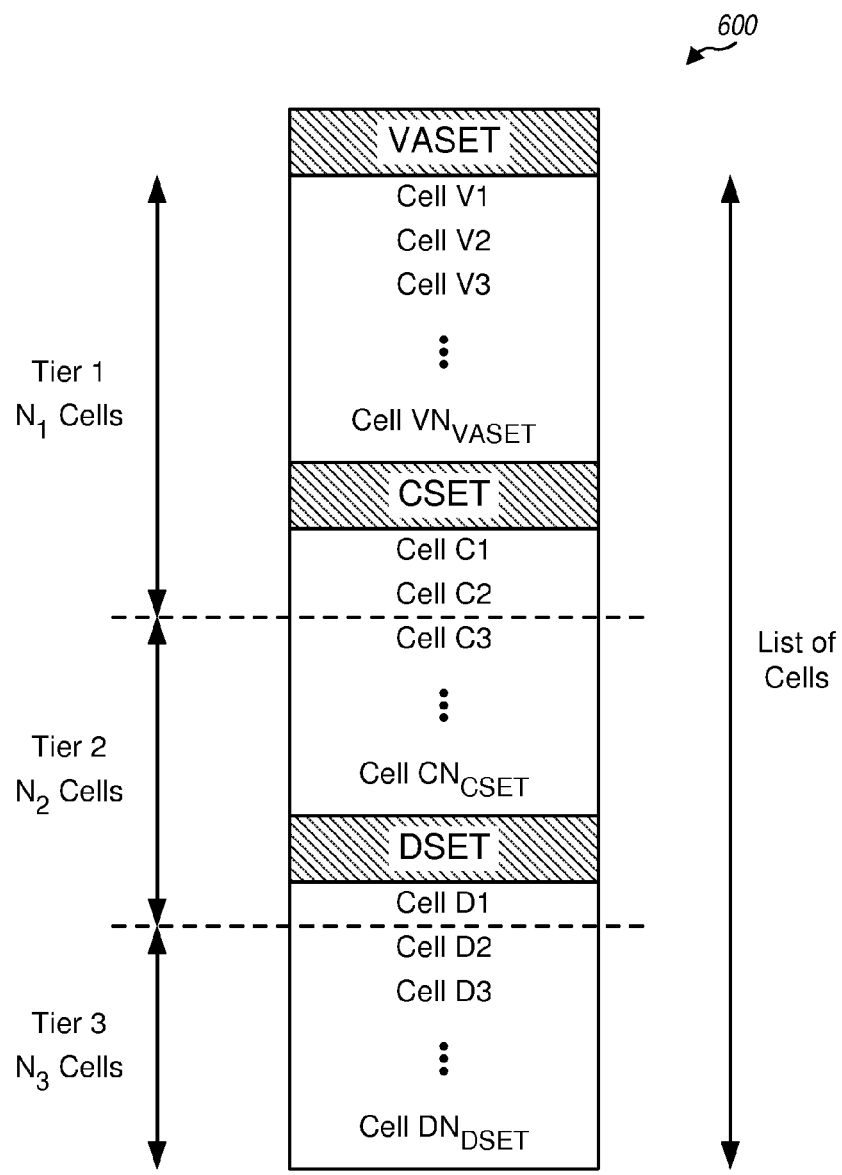
FIG. 6 shows formation of groups of cells to schedule for measurement.

FIG. 6 shows determination of tiers of cells to measure. The cells in each set may be sorted based on their RSRP, from largest RSRP to smallest RSRP. The sorted VASET may include $N_{VASET}$ cells V1 through $VN_{VASET}$, with cell V1 having the largest RSRP (and highest priority) and cell $VN_{VASET}$ having the smallest RSRP (and lowest priority). The sorted CSET may include $N_{CSET}$ cells C1 through $CN_{CSET}$, with cell C1 having the largest RSRP and cell $CN_{CSET}$ having the smallest RSRP. The sorted DSET may include $N_{DSET}$ cells D1 through $DN_{DSET}$, with cell D1 having the largest RSRP and cell $DN_{DSET}$ having the smallest RSRP.

A list of cells may be defined to include all sorted sets of cells. In particular, the list may include the sorted VASET, followed by the sorted CSET, and then followed by the sorted DSET. The sorting may be performed for each set and not across different sets of cells. The list of cells may also include newly detected cells that have not been measured and ranked lower than cells that have been measured. The newly detected cells may be sorted by received signal quality or received signal strength, which may be measured based on the PSS and/or SSS.

In the example shown in FIG. 6, the list of cells is divided into three tiers 1, 2 and 3. Tier 1 includes the $N_1$ highest priority (or topmost) cells in the list, tier 2 includes the next $N_2$ cells in the list, and tier 3 includes the remaining $N_3$ cells in the list, where $N_1$, $N_2$ and $N_3$ may each be any suitable value. The list may also be divided into fewer or more tiers. The partitioning of cells into tiers ensures that all $N_{CELL}$ cells are measured under one of the tiers in each scheduling period.

The available measurement time in each scheduling period may be dependent on various factors such as the presence or absence of gaps, whether the scheduling period is the last one in the update period, etc. The last scheduling period may have a shorter available measurement time since some time may be reserved to process the measurement results and update the sets of cells for the next update period. In general, the available measurement time ($T_{AVAIL}$) may be equal to the scheduling period or shorter. In one design that is assumed in the description below, the available measurement time for a scheduling period of 40 ms may be (i) equal to 40 ms if no gaps are present and if the scheduling period is not the last one in an update period or (ii) equal to 33 ms if a gap is present or if the scheduling period is the last one in the update period. The available measurement time may also be some other duration and may be fixed or configurable.

In one design, progressively higher priority tiers may be associated with progressively shorter measurement intervals. For example, if three tiers are present, then the measurement intervals for these three tiers may be expressed as:

$$MI_1 < MI_2 < MI_3 \quad \text{Eq (3)}$$

where $MI_1$ is the measurement interval for the highest priority tier 1, $MI_2$ is the measurement interval for the second highest priority tier 2, and $MI_3$ is the measurement interval for the lowest priority tier 3.

For each tier, the number of measurements for each cell in that tier within the available measurement time may be expressed as:

$$L_m = \text{floor}\left(\frac{T_{AVAIL}}{MI_m}\right), \quad \text{Eq (4)}$$

where $MI_m$ is the measurement interval for tier m,
$L_m$ is the number of measurements for each cell in tier m, and
floor ( ) denotes a floor operation.

In one design, the number of tiers may be dependent on the total number of cells to measure. Table 2 lists the number of tiers and the measurement interval for each tier for different total number of cells to measure. Table 2 is for an exemplary design in which the available measurement time is 40 ms. The number of cells in each tier may be computed as described below.

TABLE 2

| Total Number of Cells to Measure | Number of Tiers | Number Cells in Each Tier | Measurement Intervals |
|---|---|---|---|
| $N_{CELL} \leq 5$ | 1 | $N_1 = N_{CELL}$ | $MI_1$ = 5 ms |
| $5 < N_{CELL} \leq 10$ | 2 | $N_1, N_2$ | $MI_1$ = 5 ms, $MI_2$ = 10 ms |
| $10 < N_{CELL} \leq 15$ | 2 | $N_1, N_2$ | $MI_1$ = 10 ms, $MI_2$ = 20 ms |
| $15 < N_{CELL} \leq 20$ | 3 | $N_1, N_2, N_3$ | $MI_1$ = 10 ms, $MI_2$ = 20 ms, $MI_3$ = 40 ms |

In the design shown in Table 2, one tier may be defined when there are five or fewer cells to measure. This is shown by the first row of Table 2.

In the design shown in Table 2, two tiers may be defined when the total number of cells to measure is greater than five and less than or equal to 15. The measurement interval for each tier may be dependent on the total number of cells to measure, as shown by the second and third rows of Table 2. The number of cells in each of the two tiers ($N_1$ and $N_2$), may be computed by simultaneously solving the following equations:

$$T_{AVAIL} = L_1 \cdot N_1 + L_2 \cdot N_2, \text{ and} \quad \text{Eq (5)}$$

$$N_{CELL} = N_1 + N_2 \quad \text{Eq (6)}$$

In the design shown in Table 2, three tiers may be defined when the total number of cells to measure is greater than 15. This shown by the last row of Table 2. The number of cells in each of the three tiers ($N_1$, $N_2$ and $N_3$), may be computed by simultaneously solving the following equations:

$$T_{AVAIL} = L_1 \cdot N_1 + L_2 \cdot N_2 + L_3 \cdot N_3 \qquad \text{Eq (7)}$$

$$N_{CELL} = N_1 + N_2 + N_3, \text{ and} \qquad \text{Eq (8)}$$

$$N_1 = 5 \qquad \text{Eq (9)}$$

For clarity, several examples of cell measurement scheduling are described below. In these examples, the update period is 160 ms and covers four scheduling periods of 40 ms. $T_{AVAIL}$ is 40 ms for each of the first three scheduling periods and is 33 ms for the last scheduling period.

Figure 7A:
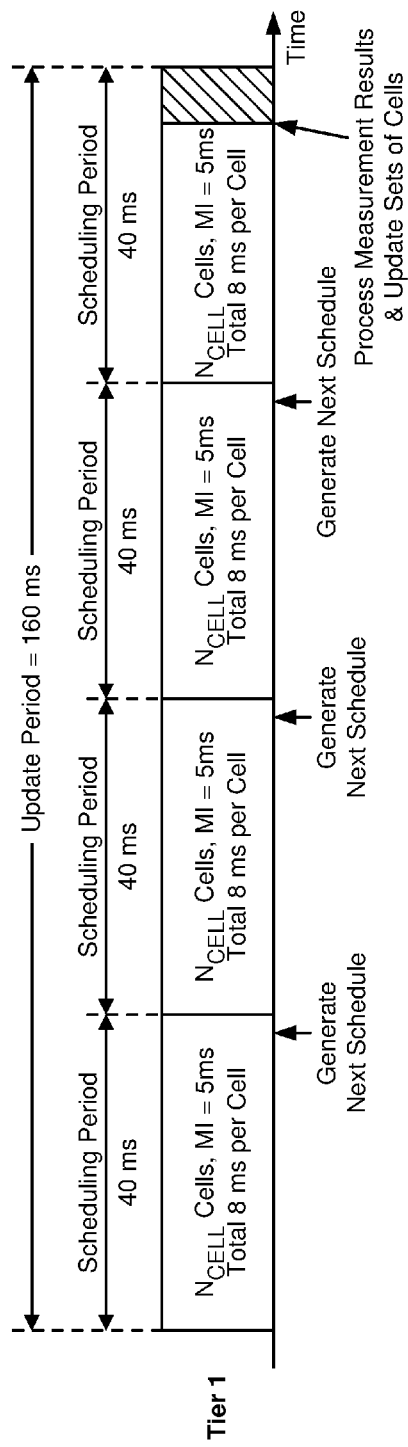
FIGS. 7A to 7C show three examples of scheduling cell measurement for different numbers of cells.

FIG. 7A shows an example of cell measurement scheduling for a case in which $N_{CELL} \le 5$. In this case, the $N_{CELL}$ cells may be included in one tier. Each cell may be scheduled with a measurement interval of 5 ms and a total measurement time of 8 ms in each scheduling period. The measurement results for all cells may be processed at the end of the last scheduling period, and the sets of cells may be updated based on the measurement results. A search for new cells may be performed every 80 ms.

Figure 7B:
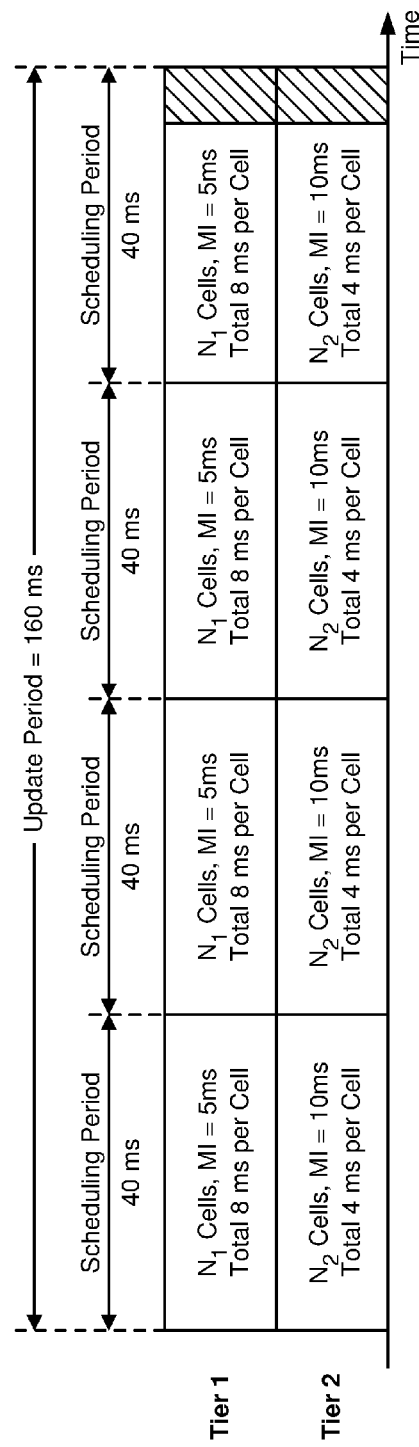

FIG. 7B shows an example of cell measurement scheduling for a case in which $5 < N_{CELL} \le 10$. In this case, the $N_{CELL}$ cells may be divided into two tiers 1 and 2. Each cell in tier 1 may be scheduled with a measurement interval of 5 ms and a total measurement time of 8 ms in each of the first three scheduling periods. Each cell in tier 2 may be scheduled with a measurement interval of 10 ms and a total measurement time of 4 ms in each of the first three scheduling periods. The measurement intervals for the two tiers and the total measurement time for each cell may be reduced in the last scheduling period due to a shorter available measurement time for 33 ms. The sets of cells may be updated based on measurement results at the end of the last scheduling period. A search for new cells may be performed every 80 ms.

The case in which $10 < N_{CELL} \le 15$ may be similar to the case in which $5 < N_{CELL} \le 10$ in FIG. 7B. The $N_{CELL}$ cells may be divided into two tiers 1 and 2 in both cases. However, the number of cells in each tier and the total measurement time for each cell in each tier in each scheduling period may be different for the two cases.

Figure 7C:
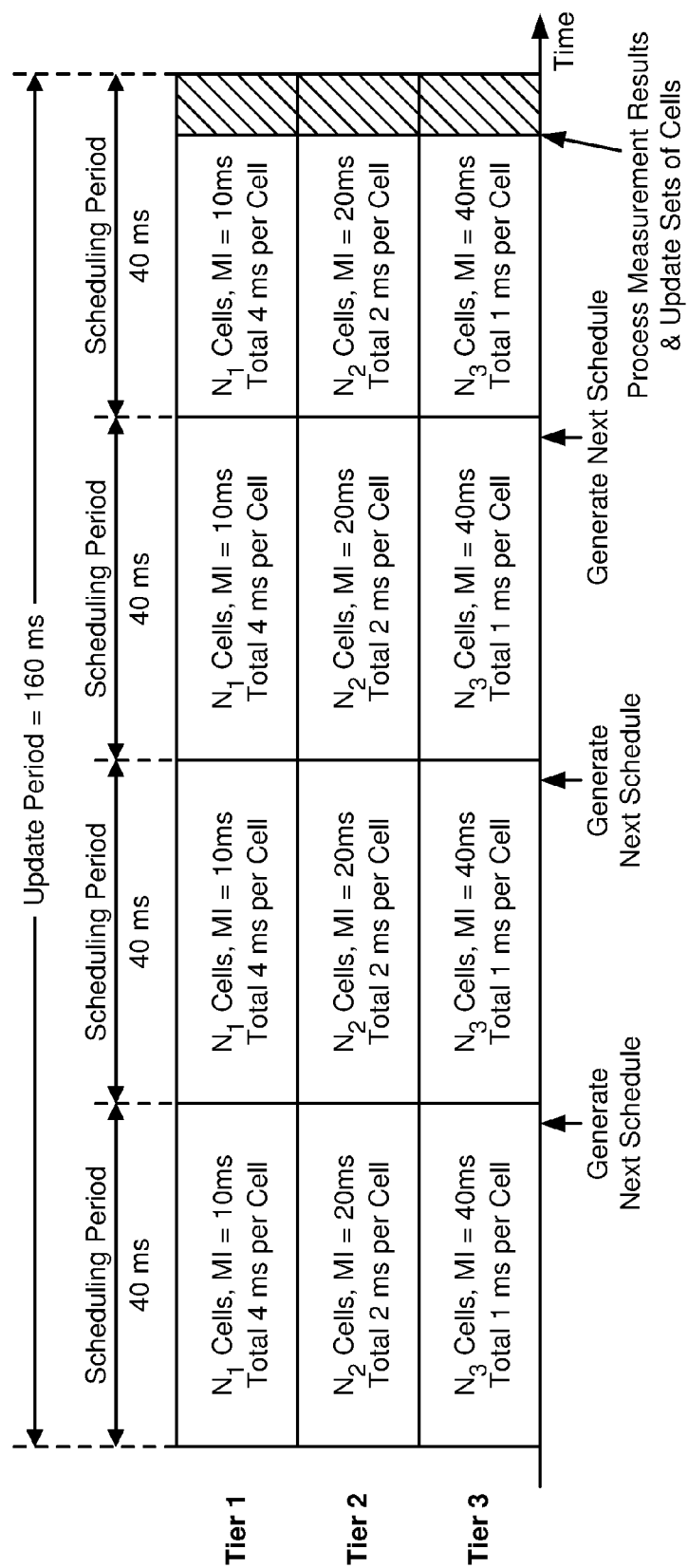

FIG. 7C shows an example of cell measurement scheduling for a case in which $15 < N_{CELL} \le 20$. In this case, the $N_{CELL}$ cells may be divided into three tiers 1, 2 and 3. In each of the first three scheduling periods, each cell in tier 1 may be scheduled with a measurement interval of 10 ms and a total measurement time of 4 ms, each cell in tier 2 may be scheduled with a measurement interval of 20 ms and a total measurement time of 2 ms, and each cell in tier 3 may be scheduled with a measurement interval of 40 ms and a total measurement time of 1 ms. The measurement intervals for the three tiers and the total measurement time for each cell may be reduced in the last scheduling period due to a shorter available measurement time of 33 ms. The sets of cells may be updated based on measurement results at the end of the last scheduling period. A search for new cells may be performed every 80 ms.

Figure 8A:
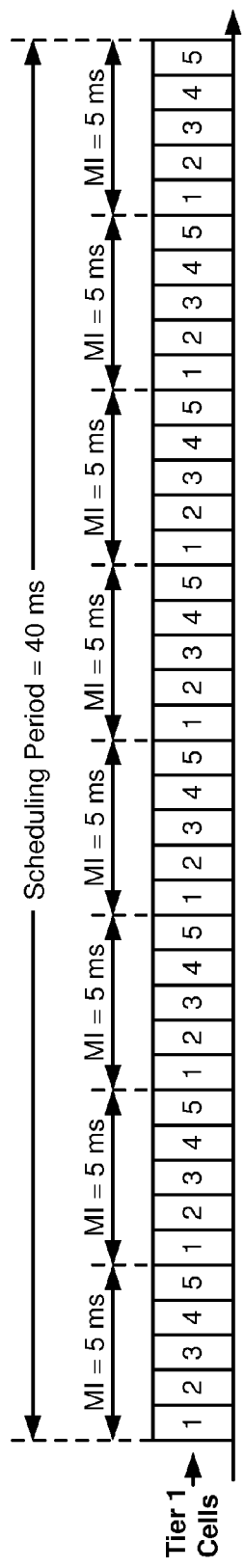
FIGS. 8A to 8C show three examples of scheduling cell measurement in one scheduling period for different numbers of cells.

FIG. 8A shows a design of cell measurement scheduling for the case in which one tier includes $N_{CELL} \le 5$ cells. One scheduling period of 40 ms includes eight measurement intervals of 5 ms. Each measurement interval is partitioned into five measurement slots, and up to five cells may be scheduled in the five measurement slots. Each cell is scheduled once in each measurement interval and a total of eight times in the scheduling period.

Figure 8B:
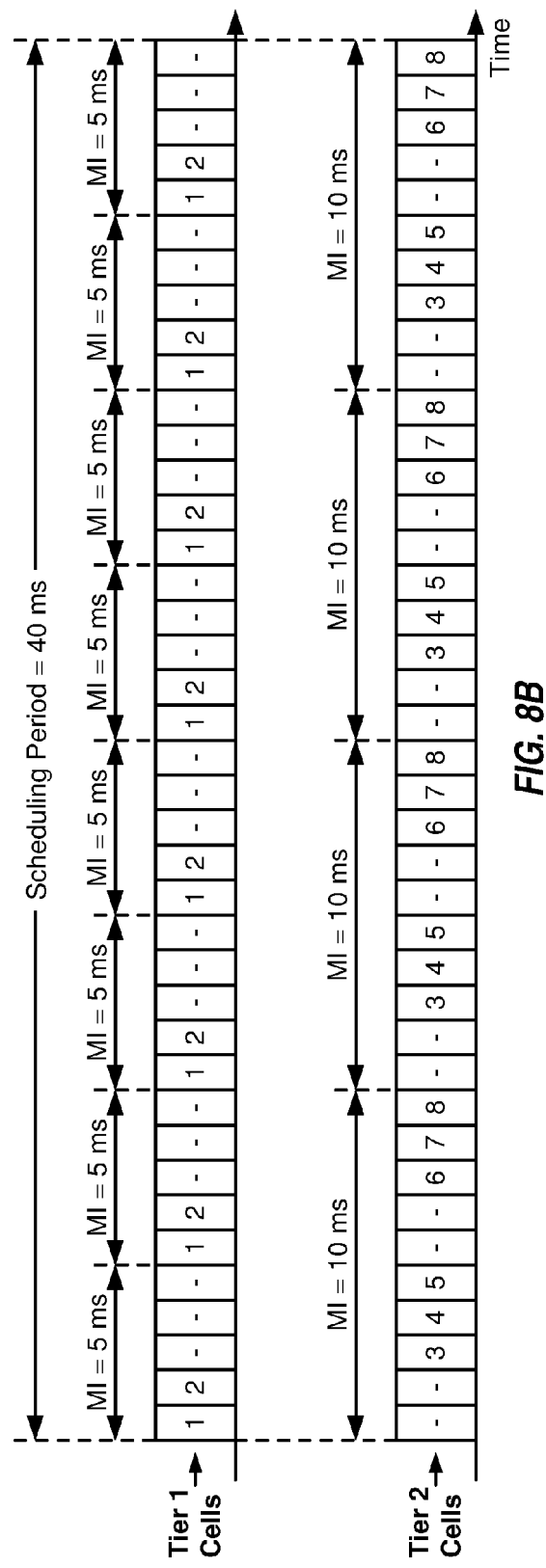

FIG. 8B shows a design of cell measurement scheduling for the case in which two tiers 1 and 2 include $5 < N_{CELL} \le 10$ cells. In the example shown in FIG. 8B, $N_{CELL} = 8$, tier 1 includes two cells 1 and 2, and tier 2 includes six cells 3 and 8. One scheduling period of 40 ms includes eight measurement intervals of 5 ms for tier 1 and four measurement intervals of 10 ms for tier 2. The cells in tier 1 are scheduled in each 5-ms measurement interval. The cells in tier 2 are scheduled in each 10-ms measurement interval, with half of the cells in tier 2 being scheduled in the first half of the 10-ms measurement interval, and the other half of the cells in tier 2 being scheduled in the second half of the 10-ms measurement interval. Each cell in tier 1 is scheduled once in each 5-ms measurement interval and a total of eight times in the scheduling period. Each cell in tier 2 is scheduled once in each 10-ms measurement interval and a total of four times in the scheduling period.

Figure 8C:
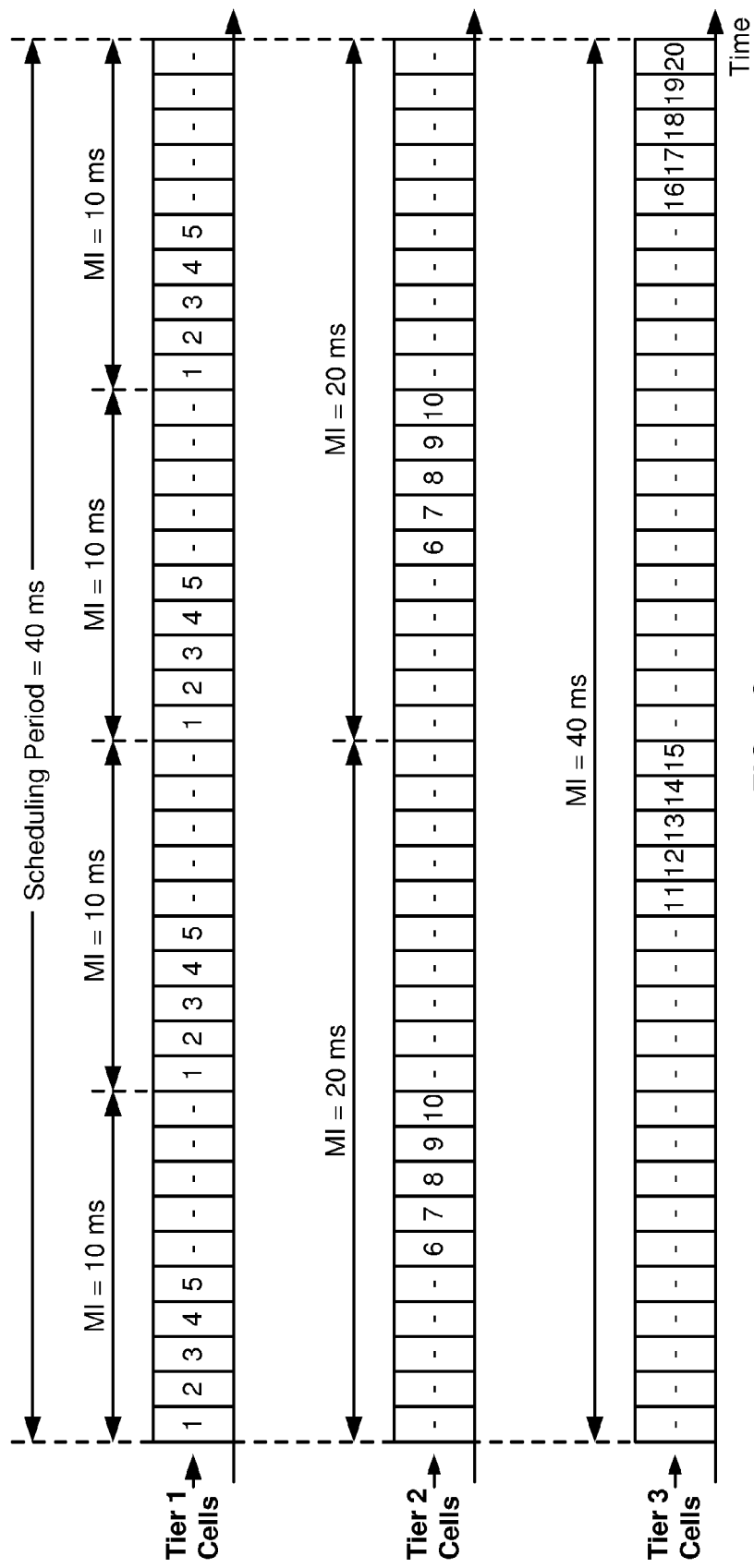

FIG. 8C shows a design of cell measurement scheduling for the case in which three tiers 1, 2, and 3 include $15 < N_{CELL} \le 20$ cells. In the example shown in FIG. 8C, $N_{CELL} = 20$, tier 1 includes five cells 1 through 5, tier 2 includes five cells 6 through 10, and tier 3 includes ten cells 11 through 20. One scheduling period of 40 ms includes four measurement intervals of 10 ms for tier 1, two measurement intervals of 20 ms for tier 2, and one measurement interval of 40 ms for tier 3. The cells in tier 1 are scheduled in the first half of each 10-ms measurement interval. The cells in tier 2 are scheduled in the second quarter of each 20-ms measurement interval. Half of the cells in tier 3 are scheduled in the fourth eighth of the 40-ms measurement interval, and the other half of the cells in tier 3 are scheduled in the last eight of the 40-ms measurement interval. Each cell in tier 1 is scheduled once in each 10-ms measurement interval and a total of four times in the scheduling period. Each cell in tier 2 is scheduled once in each 20-ms measurement interval and a total of two times in the scheduling period. Each cell in tier 3 is scheduled once in the 40-ms measurement interval.

FIGS. 7A through 8C show exemplary designs of cell measurement scheduling. Scheduling for measurement of tiers of cells or sets of cells may also be performed in other manners.

A UE may measure each cell based on various signals transmitted by the cell. For example, the UE may measure each cell based on a cell-specific reference signal (CRS), or a primary synchronization signal (PSS), or a secondary synchronization signal (SSS), or some other signal, or a combination thereof. A reference signal is a signal that is known a priori by a transmitter and a receiver and may also be referred to as pilot. A CRS is a reference signal that is specific for a cell, e.g., generated based on a cell identity (ID). A synchronization signal is a signal transmitted by a cell to support cell detection and cell acquisition. The CRS, PSS, and SSS may be transmitted in different manners and with different periodicities. For example, the CRS may be transmitted in each subframe whereas the PSS and SSS may be transmitted every five subframes in LTE.

In LTE, a cell may transmit a CRS from (i) two antenna ports in four symbol periods of a regular subframe covering 12 or 14 symbol periods or (ii) from four antenna ports in six symbol periods of a regular subframe. A cell may also transmit a CRS from (i) two antenna ports in one symbol period of a multimedia broadcast single frequency network (MBSFN) subframe covering 12 symbol periods or (ii) four antenna ports in two symbol periods of a MBSFN subframe. Measurement accuracy may be dependent on the number of symbol periods in which the CRS is transmitted. Hence, in one design, measurement for cells may be performed only in regular subframes and not in MBSFN subframes. In LTE, each radio frame of 10 ms includes ten subframes with indices of 0 through 9. In LTE, subframes 0, 4, 5 and 9 cannot be used for MBSFN subframes for frequency division duplexing (FDD), and subframes 0 and 5 cannot be used for MBSFN subframes for time division duplexing (TDD). In one design, cells may be scheduled for measurement in subframes 0, 4, 5 and 9, which are known to be regular subframes. In another design, MBSFN subframes may be determined based on system information broadcast by cells, and measurement for each cell may be scheduled on subframes that are not MBSFN subframes for that cell.

In another design, higher priority cells (e.g., cells in tiers 1 and 2 or the VASET and CSET) may be scheduled for measurement in regular subframes. Lower priority cells (e.g., cells in tier 3 or the DSET) may be scheduled for measurement in regular subframes and MBSFN subframes.

A UE may operate in a discontinuous reception (DRX) mode in which the UE may periodically wake up in each DRX cycle for a short duration. It may be desirable to reduce cell measurement and conserve battery power while operating in the DRX mode. In one design, the UE may measure cells in tier 1 in each DRX cycle and may measure cells in tiers 2 and 3 in a round robin fashion across DRX cycles. For example, a cell in tier 2 may be measured every other DRX cycle, and a cell in tier 3 may be measured every third DRX cycle. Higher priority cells may thus be measured more frequently in the DRX mode.

In one design, a UE may decode a physical broadcast channel (PBCH) of each neighbor cell of interest to obtain certain system information such as the number of transmit antennas for that neighbor cell. This information may be used to obtain a more accurate RSRP measurement. The UE may decode the PBCH of a limited number of neighbor cells in order to reduce processing overhead.

Figure 9:
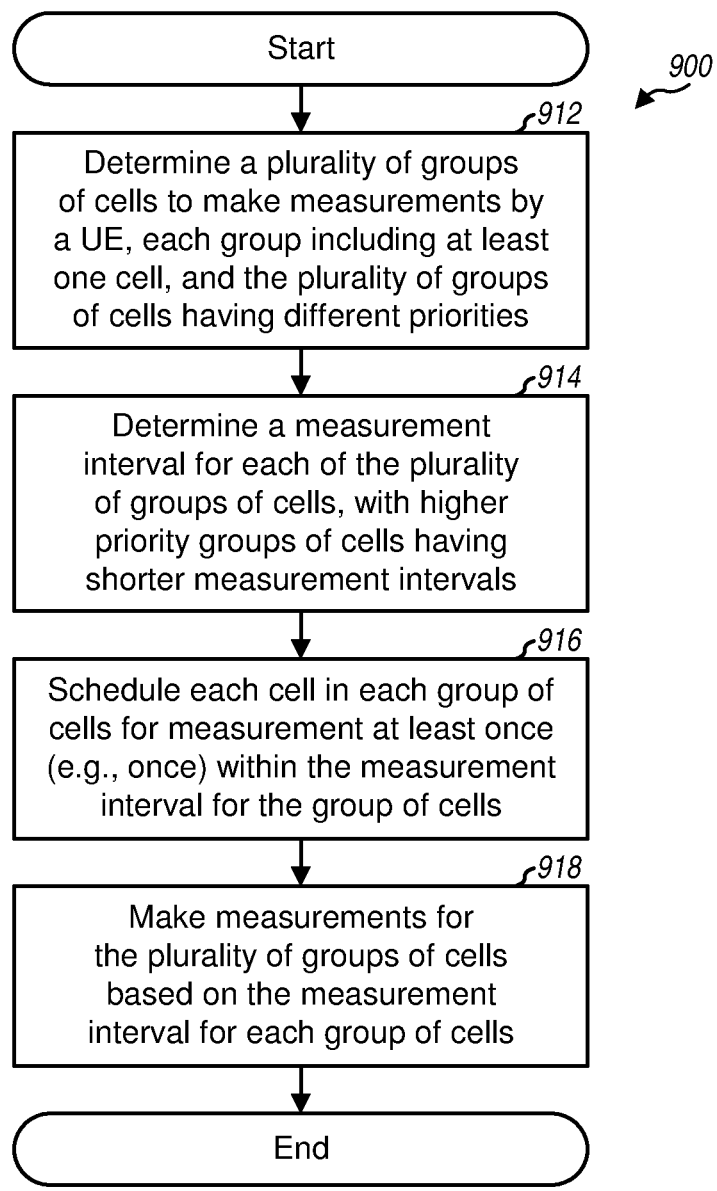
FIG. 9 shows a process for making cell measurement.

FIG. 9 shows a design of a process 900 for making cell measurement. Process 900 may be performed by a user entity (e.g., a UE) as described below or by some other entity. The user entity may determine a plurality of groups of cells to make measurements (block 912). Each group may include at least one cell, and the plurality of groups may have different priorities. The plurality of groups of cells may correspond to different tiers of cells, e.g., as described above. The user entity may determine a measurement interval for each of the plurality of groups of cells, with higher priority groups of cells having shorter measurement intervals (block 914). The user entity may schedule each cell in each group of cells for measurement at least once (e.g., just once) within the measurement interval for that group of cells (block 916). The user entity may make measurements for the plurality of groups of cells based on the measurement interval for each group of cells (block 918). The user entity may make measurements for received signal strength (e.g., RSRP), or received signal quality (RSRQ), or both, for each cell.

In one design, the plurality of groups of cells may have different measurement intervals. The highest priority group may have the shortest measurement interval, and the lowest priority group may have the longest measurement interval. In one design, the measurement interval for each group may be configurable and may be selected from a plurality of possible measurement intervals for that group.

In one design, the user entity may determine the total number of cells to make measurements. The user entity may then determine the number of groups of cells based on the total number of cells to make measurements, or available measurement time, or some other information, or a combination thereof. In one design, the user entity may determine the measurement interval for each group of cells based on the total number of cells to make measurements, or the available measurement time, or the number of groups of cells, or some other information, or a combination thereof. In one design, the user entity may determine the number of cells in each group based on the total number of cells to make measurements, or the available measurement time, or the measurement interval for each group of cells, or a combination thereof. In general, the user entity may determine the number of groups of cells, or the number of cells in each group, or the measurement interval for each group, or some other parameter, or a combination thereof based on one or more inputs such as the total number of cells to make measurements, the available measurement time, the measurement duration for each cell, etc.

In one design, the user entity may maintain a plurality of sets of cells. Each set may include at least one cell and may be associated with conditions for cells entering and leaving the set. In one design, the plurality of sets of cells may include a first set (e.g., the VASET) of cells with received signal strength satisfying at least one condition. The plurality of sets of cells may include a second set (e.g., the CSET) of cells with received signal strength not satisfying the at least one condition for inclusion in the first set of cells. The plurality of sets of cells may further include a third set (e.g., the DSET) of cells detected by the user entity but not yet measured by the user entity. The plurality of sets of cells may also include fewer, more, or different sets of cells, which may be defined in other manners. In one design, each set may include a variable number of cells. In one design, the total number of cells in the plurality of sets may be limited to a predetermined maximum number of cells. The plurality of sets of cells may also have other characteristics.

The user entity may determine the plurality of groups of cells in various manners. In one design, the user entity may determine the plurality of groups of cells based on the plurality of sets of cells. In one design, each group of cells may correspond to one set of cells. In another design, each group of cells may include all or part of one or more sets of cells. For the design shown in FIG. 6, the user entity may first sort each of the plurality of sets of cells, with the at least one cell in each sorted set being arranged from highest priority to lowest priority (e.g., from highest RSRP to lowest RSRP). The user entity may then form a list of cells with the plurality of sorted sets of cells, with the plurality of sorted sets of cells being arranged from highest priority to lowest priority in the list. The user entity may then form the plurality of groups of cells based on the list of cells. The user entity may form one group of cells at a time, starting with the highest priority group. For each group, the user entity may select a sufficient number of cells starting from the top of the list for inclusion in that group.

In yet another design, the user entity may determine the plurality of groups of cells without maintaining the plurality of sets of cells. The user entity may sort a plurality of cells to measure from highest priority to lowest priority, e.g., based on received signal strength, or received signal quality, and/or some other quantity for each cell. The user entity may then form the plurality of groups of cells based on the sorted plurality of cells, e.g., one group at a time, starting with the highest priority group. The user entity may also determine the plurality of groups of cells in other manners.

In one design, the user entity may schedule the plurality of groups of cells for measurement in subframes with at least a predetermined amount of reference signal (e.g., regular subframes) and not in subframes with less than the predetermined amount of reference signal (e.g., MBSFN subframes).

In one design, the user entity may operate in a DRX mode. The user entity may schedule the group of cells with the highest priority for measurement in each DRX cycle. The user entity may schedule each remaining group of cells for measurement less frequently than in each DRX cycle, e.g., in every Q-th DRX cycle, where Q is greater than one.

Figure 10:
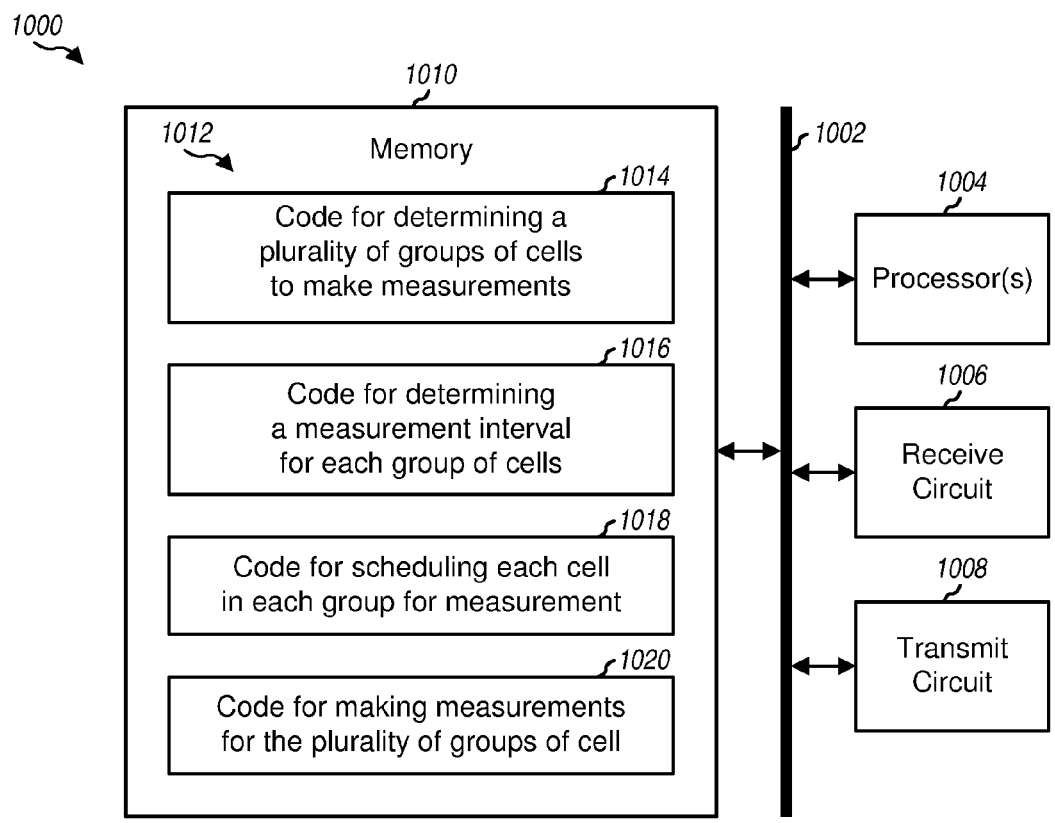
FIG. 10 shows an apparatus for making cell measurement.

FIG. 10 shows part of a hardware implementation of an apparatus 1000 supporting wireless communication. Apparatus 1000 includes circuitry and may be one configuration of a user entity (e.g., a UE) or some other entity. In this specification and the appended claims, the term "circuitry" is construed as a structural term and not as a functional term. For example, circuitry may be an aggregate of circuit components, such as a multiplicity of integrated circuit components, in the form of processing and/or memory cells, units, blocks and the like, such as shown and described in FIG. 10.

Apparatus 1000 comprises a central data bus 1002 linking several circuits together. The circuits include one or more processors 1004, a receive circuit 1006, a transmit circuit 1008, and a memory 1010. Memory 1010 is in electronic communication with processor(s) 1004, so that processor(s) 1004 may read information from and/or write information to memory 1010. Processor(s) 1004 may comprise a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. Processor(s) 1004 may include a combination of processing devices, e.g., a combination of a DSP and a microprocessor, a plurality of microprocessors, one or more microprocessors in conjunction with a DSP core, or any other such configuration.

Receive circuit 1006 and transmit circuit 1008 may be connected to a radio frequency (RF) circuit (not shown in FIG. 10). Receive circuit 1006 may process and buffer received signals before sending the signals out to data bus 1002. Transmit circuit 1008 may process and buffer data from data bus 1002 before sending the data out of apparatus 1000. Processor(s) 1004 may perform the function of data management of data bus 1002 and further the function of general data processing, including executing the instructional contents of memory 1010. Transmit circuit 1008 and receive circuit 1006 may be external to processor(s) 1004 (as shown in FIG. 10) or may be part of processor(s) 1004.

Memory 1010 stores a set of instructions 1012 executable by processor(s) 1004 to implement the methods described herein. Instructions 1012 may include code 1014 for determining a plurality of groups of cells to make measurements, code 1016 for determining a measurement interval for each group of cells, code 1018 for scheduling each cell in each group of cells for measurement at least once within the measurement interval for the group, and code 1020 for making measurements for the plurality of groups of cells based on the measurement interval for each group. Instructions 1012 may include other codes for other functions. Instructions 1012 shown in memory 1010 may comprise any type of computer-readable statement(s). For example, instructions 1012 in memory 1010 may refer to one or more programs, routines, sub-routines, modules, functions, procedures, data sets, etc. Instructions 1012 may comprise a single computer-readable statement or many computer-readable statements.

Memory 1010 may be a RAM (Random Access Memory) circuit. Memory 1010 may be tied to another memory circuit (not shown), which may either be of a volatile or a nonvolatile type. As an alternative, memory 1010 may be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. Memory 1010 may be considered to be an example of a computer-program product that comprises a computer-readable medium with instructions 1012 stored therein.

The functions described herein may be implemented in hardware, software, firmware, or any combination thereof. If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the networks, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   determining a plurality of groups of cells to make measurements by a user entity, each group including at least one cell, and the plurality of groups of cells having different priorities;
   determining a measurement interval for each of the plurality of groups of cells, with higher priority groups of cells having shorter measurement intervals;
   making measurements for the plurality of groups of cells based on the measurement interval for each group of cells; and
   updating which cells are in which group based on the measurements.

2. The method of claim 1, wherein the plurality of groups of cells have different measurement intervals, with a highest priority group of cells having a shortest measurement interval and a lowest priority group of cells having a longest measurement interval.

3. The method of claim 1, wherein the measurement interval for each group of cells is configurable and selected from a plurality of possible measurement intervals for the group of cells.

4. The method of claim 1, further comprising:
determining a total number of cells to make measurements; and
determining a number of groups of cells based on the total number of cells to make measurements, or available measurement time, or both.

5. The method of claim 4, wherein the determining the measurement interval for each of the plurality of groups of cells comprises determining the measurement interval for each group of cells based on the total number of cells to make measurements, or the available measurement time, or the number of groups of cells, or a combination thereof.

6. The method of claim 4, further comprising:
determining the number of cells in each of the plurality of groups of cells based on the total number of cells to make measurements, or the available measurement time, or the measurement interval for each group of cells, or a combination thereof.

7. The method of claim 1, wherein the determining the plurality of groups of cells comprises determining the plurality of groups of cells based on a plurality of sets of cells, each set including at least one cell and associated with conditions for cells entering and leaving the set.

8. The method of claim 7, wherein each of the plurality of groups of cells corresponds to one of the plurality of sets of cells.

9. The method of claim 7, wherein the plurality of sets of cells include a first set of cells with received signal strength satisfying at least one condition.

10. The method of claim 9, wherein the plurality of sets of cells include a second set of cells with received signal strength not satisfying the at least one condition for inclusion in the first set of cells.

11. The method of claim 10, wherein the plurality of sets of cells include a third set of cells detected by the user entity but not yet measured by the user entity.

12. The method of claim 7, wherein each set includes a variable number of cells, and wherein total number of cells in the plurality of sets is limited to a predetermined maximum number of cells.

13. The method of claim 7, wherein a number of cells in each set is less than or equal to a number of cells in a next lower prior set.

14. The method of claim 7, wherein the determining the plurality of groups of cells comprises
sorting each of the plurality of sets of cells, with the at least one cell in each sorted set being arranged from highest priority to lowest priority,
forming a list of cells with the plurality of sorted sets of cells, with the plurality of sorted sets of cells being arranged from highest priority to lowest priority in the list, and
forming the plurality of groups of cells based on the list of cells.

15. The method of claim 1, wherein the determining the plurality of groups of cells comprises:
sorting a plurality of cells from highest priority to lowest priority, and
forming the plurality of groups of cells based on the sorted plurality of cells, one group at a time starting with a highest priority group.

16. The method of claim 1, further comprising:
scheduling each cell in each group of cells for measurement at least once within the measurement interval for the group of cells.

17. The method of claim 1, further comprising:
scheduling the plurality of groups of cells for measurement in subframes with at least a predetermined amount of reference signal and not in subframes with less than the predetermined amount of reference signal.

18. The method of claim 1, further comprising:
scheduling a group of cells with highest priority among the plurality of groups of cells for measurement in each discontinuous reception cycle when the user entity operates in a discontinuous reception mode; and
scheduling each remaining group of cells among the plurality of groups of cells for measurement less frequently than in each discontinuous reception cycle when the user entity operates in the discontinuous reception mode.

19. An apparatus for wireless communication, comprising:
means for determining a plurality of groups of cells to make measurements by a user entity, each group including at least one cell, and the plurality of groups of cells having different priorities;
means for determining a measurement interval for each of the plurality of groups of cells, with higher priority groups of cells having shorter measurement intervals;
means for making measurements for the plurality of groups of cells based on the measurement interval for each group of cells; and
means for updating which cells are in which group based on the measurements.

20. The apparatus of claim 19, wherein the plurality of groups of cells have different measurement intervals, with a highest priority group of cells having a shortest measurement interval and a lowest priority group of cells having a longest measurement interval.

21. The apparatus of claim 19, further comprising:
means for determining a total number of cells to make measurement; and
means for determining a number of groups of cells based on the total number of cells to make measurements, or available measurement time, or both.

22. The apparatus of claim 21, further comprising:
means for determining the number of cells in each of the plurality of groups of cells based on the total number of cells to make measurements, or the available measurement time, or the measurement interval for each group of cells, or a combination thereof.

23. The apparatus of claim 19, wherein the means for determining the plurality of groups of cells comprises means for determining the plurality of groups of cells based on a plurality of sets of cells, each set including at least one cell and associated with conditions for cells entering and leaving the set.

24. The apparatus of claim 23, wherein the means for determining the plurality of groups of cells comprises
means for sorting each of the plurality of sets of cells, with the at least one cell in each sorted set being arranged from highest priority to lowest priority,
means for forming a list of cells with the plurality of sorted sets of cells, with the plurality of sorted sets of cells being arranged from highest priority to lowest priority in the list, and means for forming the plurality of groups of cells based on the list of cells.

25. The apparatus of claim 19, wherein the means for determining the plurality of groups of cells comprises:
- means for sorting a plurality of cells from highest priority to lowest priority, and
- means for forming the plurality of groups of cells based on the sorted plurality of cells, one group at a time starting with a highest priority group.

26. An apparatus for wireless communication, comprising:
circuitry configured to:
- determine a plurality of groups of cells to make measurements by a user entity, each group including at least one cell, and the plurality of groups of cells having different priorities;
- determine a measurement interval for each of the plurality of groups of cells, with higher priority groups of cells having shorter measurement intervals;
- make measurements for the plurality of groups of cells based on the measurement interval for each group of cells; and
- update which cells are in which group based on the measurements.

27. The apparatus of claim 26, wherein the plurality of groups of cells have different measurement intervals, with a highest priority group of cells having a shortest measurement interval and a lowest priority group of cells having a longest measurement interval.

28. The apparatus of claim 26, wherein the circuitry is configured to:
- determine a total number of cells to make measurements; and
- determine a number of groups of cells based on the total number of cells to make measurements, or available measurement time, or both.

29. The apparatus of claim 28, wherein the circuitry is configured to determine the number of cells in each of the plurality of groups of cells based on the total number of cells to make measurements, or the available measurement time, or the measurement interval for each group of cells, or a combination thereof.

30. The apparatus of claim 26, wherein the circuitry is configured to determine the plurality of groups of cells based on a plurality of sets of cells, each set including at least one cell and associated with conditions for cells entering and leaving the set.

31. The apparatus of claim 30, wherein the circuitry is configured to:
- sort each of the plurality of sets of cells, with the at least one cell in each sorted set being arranged from highest priority to lowest priority;
- form a list of cells with the plurality of sorted sets of cells, with the plurality of sorted sets of cells being arranged from highest priority to lowest priority in the list; and
- form the plurality of groups of cells based on the list of cells.

32. The apparatus of claim 26, wherein the circuitry is configured to:
- sort a plurality of cells from highest priority to lowest priority; and
- form the plurality of groups of cells based on the sorted plurality of cells, one group at a time starting with a highest priority group.

33. A computer program product, comprising:
a non-transitory computer-readable medium comprising:
- code for causing at least one computer to determine a plurality of groups of cells to make measurements by a user entity, each group including at least one cell, and the plurality of groups of cells having different priorities,
- code for causing the at least one computer to determine a measurement interval for each of the plurality of groups of cells, with higher priority groups of cells having shorter measurement intervals,
- code for causing the at least one computer to make measurements for the plurality of groups of cells based on the measurement interval for each group of cells, and
- code for causing the at least one computer to update which cells are in which group based on the measurements.

* * * * *